United States Patent
Dhavale et al.

(10) Patent No.: US 9,846,734 B2
(45) Date of Patent: *Dec. 19, 2017

(54) TRANSPARENTLY MIGRATING A STORAGE OBJECT BETWEEN NODES IN A CLUSTERED STORAGE SYSTEM

(71) Applicant: NetApp, Inc., Sunnyvale, CA (US)

(72) Inventors: Poonam Dhavale, Sunnyvale, CA (US); Susan M. Coatney, Cupertino, CA (US); Steven S. Watanabe, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 14/861,699

(22) Filed: Sep. 22, 2015

(65) Prior Publication Data
US 2016/0012117 A1    Jan. 14, 2016

Related U.S. Application Data

(63) Continuation of application No. 14/278,314, filed on May 15, 2014, now Pat. No. 9,141,492.

(51) Int. Cl.
*G06F 17/30* (2006.01)
*G06F 7/00* (2006.01)
(Continued)

(52) U.S. Cl.
CPC ...... *G06F 17/30575* (2013.01); *G06F 3/0647* (2013.01); *G06F 7/00* (2013.01);
(Continued)

(58) Field of Classification Search
CPC .... G06F 3/0647; G06F 17/30079; G06F 7/00; G06F 17/30; G06F 17/30091; G06F 17/30203; G06F 11/2005
See application file for complete search history.

(56) References Cited

U.S. PATENT DOCUMENTS

| | | | |
|---|---|---|---|
| 6,772,161 B2 | 8/2004 | Mahalingam et al. | |
| 7,058,846 B1 * | 6/2006 | Kelkar | G06F 11/2033 714/11 |

(Continued)

OTHER PUBLICATIONS

Sun Cluster 3.0 System Administration Guide, Sun Microsystems, Inc., Nov. 2000, Revision A, hereafter "SunCluster30SysAdm".*

(Continued)

*Primary Examiner* — Kuen S Lu
(74) *Attorney, Agent, or Firm* — LeClairRyan, a Professional Corporation

(57) ABSTRACT

A storage object is migrated between nodes by a source node automatically verifying that another node is configured to service the storage object and changing ownership of the storage object based on the verifying. A cluster manager for the clustered storage system receives a request and provides the request to the source which owns the storage object. The source verifies that the destination is configured according to a predetermined configuration for servicing the storage object. Based on the verifying, the source offlines the storage object and updates ownership information of the storage object, thereafter allowing the destination to online the storage object. The cluster manager further provides the updated ownership information to all the nodes in the cluster, so an access request intended for the storage object may be received by any node and forwarded to the destination using the updated ownership information to effect a transparent migration.

18 Claims, 8 Drawing Sheets

(51) Int. Cl.
*G06F 11/20* (2006.01)
*G06F 3/06* (2006.01)

(52) U.S. Cl.
CPC ...... *G06F 11/2033* (2013.01); *G06F 11/2092* (2013.01); *G06F 17/30* (2013.01); *G06F 17/30079* (2013.01); *G06F 17/30091* (2013.01); *G06F 17/30203* (2013.01); *G06F 17/30607* (2013.01); *G06F 17/30864* (2013.01); *G06F 11/2005* (2013.01); *G06F 11/2046* (2013.01); *G06F 17/30067* (2013.01); *G06F 17/30194* (2013.01); *G06F 17/30221* (2013.01)

(56) References Cited

U.S. PATENT DOCUMENTS

| | | | | |
|---|---|---|---|---|
| 7,171,659 B2* | 1/2007 | Becker | ............... | H04L 29/06 709/217 |
| 7,296,068 B1* | 11/2007 | Sarma | ............... | G06F 3/061 703/223 |
| 7,546,302 B1* | 6/2009 | Coatney | ............... | G06F 11/1658 |
| 7,689,862 B1* | 3/2010 | Bharthulwar | ............... | G06F 11/2046 714/13 |
| 7,941,511 B2* | 5/2011 | Takamoto | ............... | H04L 69/40 709/220 |
| 8,135,981 B1* | 3/2012 | Gawali | ............... | G06F 11/0727 714/42 |
| 2003/0182427 A1 | 9/2003 | Halpern | | |
| 2010/0114889 A1 | 5/2010 | Rabii et al. | | |
| 2011/0119748 A1* | 5/2011 | Edwards | ............... | G06F 9/5077 726/12 |

OTHER PUBLICATIONS

"Data ONTAP® 7.0 V-Series Systems-Software Setup, Installation, and Management Guide", Dec. 15, 2005, 175 pages.
"Spinnaker Networks, Inc .. "NFS Industry Conference"", Oct. 22-23, 2002, 30 pages.
"U.S. Appl. No. 12/626,551 Final Office Action", Final Office Action, dated Jun. 28, 2012, 33 pages.
"U.S. Appl. No. 12/626,551 Office Action", Non-Final Office Action, dated Nov. 9, 2011, 35 pages.
Huang, et al., "Load Balancing for Clusters of VOD Servers", 2004, pp. 113-138.

* cited by examiner

| Config Table 550 |
|---|
| Cluster_quorum     551 |
| Version_#     552 |
| Max_limit     553 |
| Aggregate_access     554 |
| ...     555 |

FIG. 5B

TRANSPARENTLY MIGRATING A STORAGE OBJECT BETWEEN NODES IN A CLUSTERED STORAGE SYSTEM

RELATED APPLICATIONS

This application is a continuation of U.S. patent application Ser. No. 14/278,314, filed May 15, 2014, which is a continuation of U.S. patent application Ser. No. 12/626,551, filed Nov. 25, 2009, each of which is hereby incorporated by reference in its entirety.

BACKGROUND

The disclosed subject matter relates to clustered storage systems, and more particularly, to transparently migrating a storage object between source and destination nodes by automatically verifying the destination node is configured to service the storage object and changing ownership information of the storage object based on the verifying to enable servicing of the aggregate at the destination.

A storage server is a computer that provides access to information that is stored on one or more storage devices connected to the storage server, such as disk drives ("disks"), flash memories, or storage arrays. The storage server includes an operating system that may implement a storage abstraction layer to logically organize the information as storage objects on the storage devices. With certain logical organizations, the storage abstraction layer may involve a file system which organizes information as a hierarchical structure of directories and files. Each file may be implemented as set of data structures, e.g., disk blocks, configured to store information, such as the actual data for the file. The file system typically organizes such data blocks as a logical "volume," with one or more volumes further organized as a logical "aggregate" for efficiently managing multiple volumes as a group. In a file system, each directory, file, volume, and aggregate may constitute a storage object. In other logical organizations, a file system may constitute a storage object with the storage abstraction layer managing multiple file systems.

A storage server may be configured to operate according to a client/server model of information delivery to allow one or more clients access to data in storage objects stored on the storage server. In this model, the client may comprise an application executing on a computer that "connects" to the storage server over a computer network, such as a point-to-point link, shared local area network, wide area network or virtual private network implemented over a public network, such as the Internet. A client may access the storage devices by submitting access requests to the storage server, for example, a "write" request to store client data included in a request to storage devices or a "read" request to retrieve client data stored in the storage devices.

Multiple storage servers may be networked or otherwise connected together as a storage system to distribute the processing load of the system across multiple storage servers. Processing load involves the load on a storage server to service storage requests from clients directed to a storage object (e.g., aggregate) of the storage server. In certain cases, however, one of the storage servers may be more heavily loaded than another storage server in the system. Thus, it may be desirable to offload client requests for an aggregate from one storage server (source) to another (destination). In other instances, a source may undergo routine maintenance processing or upgrades, so it may also be desirable for a destination to carry out requests on the aggregate to ensure continued access to client data during those periods. In these cases, "ownership" (servicing) of an aggregate by a storage server may be changed by migrating the aggregate between storage servers.

One known technique for migrating aggregates involves copying data of an aggregate from the source to the destination. However, copy operations may result in increased load on both the source and destination during migration since each must still continue to perform normal processing tasks such as servicing other aggregates. Additionally, copy operations are not instantaneous and, depending on the size of the aggregate and the physical distance between storage servers, a lengthy delay in accessing an aggregate may be experienced by a client. Conventional techniques using copy operations to migrate aggregates thus tie up system resources such as network bandwidth and may cause increased delays in accessing client data.

To avoid unwieldy copy operations, another known technique referred to as "zero-copy migration" may be performed between storage servers configured in a distributed architecture. Here, storage servers are implemented as "nodes" in the storage system, where each node accesses a shared pool of storage containing the aggregates of the system. Although multiple nodes have physical access to an aggregate in the shared storage pool, only one of the nodes owns the aggregate at any one time. In the event a migration operation is desirable, a zero-copy migration operation may be performed by passing ownership of the aggregate to another node without copying data between physically remote locations. The passing of ownership may, for instance, be carried out by known storage protocols operating between the nodes to relinquish or gain control of the aggregate in shared storage.

In order to enable zero-copy migration, however, a storage administrator must manually configure each of the nodes in the system to facilitate ownership changes to the aggregate. This involves a non-trivial task of configuring the physical components such as the network interface controllers of the nodes to enable the hand-off process between the nodes. In certain cases, this may require unwieldy manual effort on the part of the administrator, as well as specialized knowledge and/or skills, in performing the task. Additionally, information related to aggregates owned by a particular node must also be maintained by the client in order to gain network access to the aggregate. To that end, node and aggregate information must further be managed by the clients upon migration so client requests may be directed to the appropriate node.

The conventional zero-copy migration technique is further deficient if the data storage needs of the administrator change. For instance, the administrator may desire to enhance the capability of the cluster to provide additional storage capacity and/or processing capabilities as storage needs grow. As such, a storage system which readily scales to such changing needs would be preferable under these circumstances. However, using conventional techniques, at least one other node in the system must be reconfigured by the administrator to extend the zero-copy migration functionality to a new node added to the system. Thus, while known techniques for zero-copy operations do avoid tying up network resources and lengthy data access delays, other deficiencies still exist with known techniques for zero-copy migration of aggregates between storage servers.

SUMMARY

Embodiments of the disclosed subject matter provide a technique, in a clustered storage system, for transparently migrating a storage object (e.g., aggregate) between nodes by one of the nodes (source) automatically verifying a destination node (destination) is configured to service the aggregate and changing ownership of the aggregate based on the verifying to enable servicing of the aggregate at the destination. A cluster manager for the clustered storage system receives an aggregate migration request and provides the request to the source which owns the aggregate. The source verifies with the destination that the destination is configured to service the aggregate. Based on the verifying, the source updates ownership information of the aggregate thereby allowing the destination to own the aggregate. The cluster manager further provides the updated ownership information to all the nodes in the cluster, so an access request intended for the aggregate may be received by any node and forwarded to the destination using the updated ownership information to effect a transparent migration.

By implementing the novel techniques, aggregate migration may be performed more efficiently to overcome the deficiencies of conventional copy operations and zero-copy migration techniques. Since the nodes in the cluster are configured to redirect a storage request to the appropriate destination, migration operations do not require further processing and management tasks by the client after a migration operation and may be performed automatically upon the administrator invoking or initiating a migration operation. Since the source automatically verifies that the destination is configured to service the aggregate prior to a migration operation, migration may be performed between any of the nodes regardless of whether the nodes are pre-configured to perform migration operations. Unwieldy configuration tasks by the administrator are also reduced to provide a scalable storage system which meets the changing needs of the administrator.

Advantageously, aggregates may be migrated between nodes to distribute processing load among the nodes or to otherwise change ownership of an aggregate from a source node to a destination node. Efficiently change of ownership of the aggregate may be desirable when performing maintenance or upgrade operations at the source node, for instance, which would otherwise preclude the source node from servicing the aggregate during such operations. In this way, aggregate migration between the nodes may be performed more efficiently and effectively to optimize use of system resources and provide improved system performance for carrying out storage operations.

Additional aspects of the inventive subject matter will become apparent from the following detailed description taken in conjunction with the accompanying drawings, which illustrate the principles of the inventive subject matter by way of example.

BRIEF DESCRIPTION OF THE DRAWINGS

The accompanying drawings, which are incorporated in and constitute a part of this specification, illustrate an implementation of the inventive subject matter and, together with the description, serve to explain the advantages and principles of the inventive subject matter. In the drawings.

FIG. 5B illustrates an exemplary config table for storing the predetermined configuration of the destination when verifying the destination is configured to service the aggregate in one embodiment;

DETAILED DESCRIPTION

A technique for transparently migrating a storage object between nodes in a clustered storage system by automatically verifying a destination node is configured to service the storage object and changing ownership of the storage object to the destination node based on the verifying is provided herein. References in this specification to "an embodiment", "one embodiment", or the like, mean that the particular feature, structure or characteristic being described is included in at least one embodiment of the disclosed subject matter. Occurrences of such phrases in this specification do not necessarily all refer to the same embodiment, nor are they necessarily mutually exclusive.

System Overview

Figure 1:
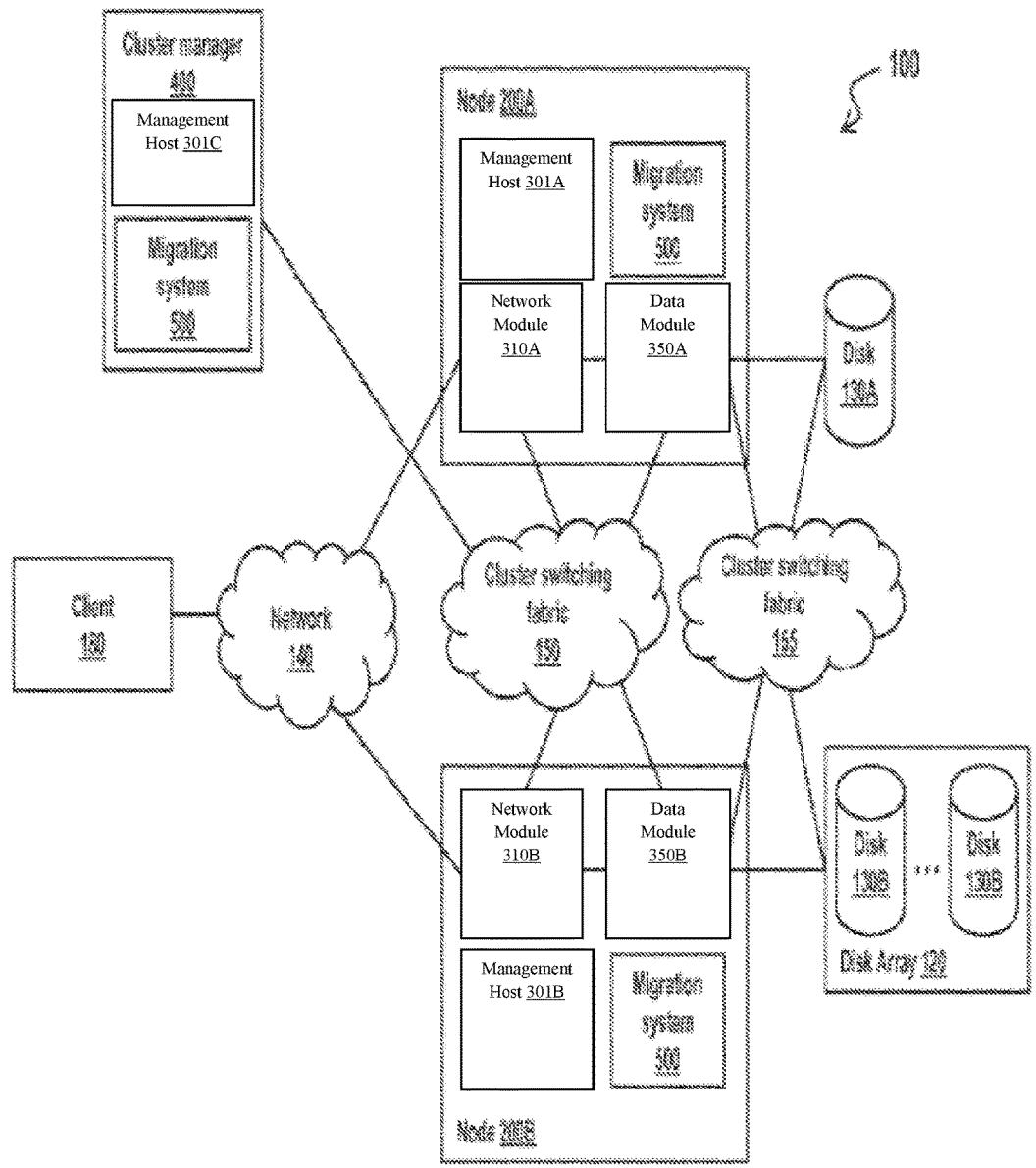
FIG. 1 illustrates a clustered storage system in which the disclosed subject matter may be implemented.

FIG. 1 shows an illustrative distributed storage system 100, also referred to as a "cluster", in which the disclosed subject matter can advantageously be implemented in one embodiment. Nodes 200 (nodes 200A, 200B) each implement a storage server and may be interconnected by a cluster switching fabric 150, which may be embodied as a Gigabit Ethernet switch, for instance. Nodes 200 access a storage subsystem 130 that include mass storage devices (e.g., disks) to provide data storage services to one or more clients 180 through a network 140. Network 140 may be, for example, a local area network (LAN), wide area network (WAN), metropolitan area network (MAN), global area network such as the Internet, a Fibre Channel fabric, or any combination of such interconnects. Client 180 may be, for example, a conventional personal computer (PC), server-class computer, workstation, handheld computing or communication device, or other special or general purpose computer.

Storage of data in disks 130 is managed by nodes 200 which receive and respond to various read and write requests from client 180, directed to data stored in or to be stored on disk. Although the illustrative embodiment implements the storage subsystem as disks, the storage subsystem may in other embodiments be implemented by other mass storage devices which can include, for example, flash memory, optical disks, tape drives, or other similar media adapted to store information. Disks 130 may further be organized into an array 120 implementing a Redundant Array of Inexpensive Disks (RAID) scheme, whereby nodes 200 access disks 130 using one or more RAID protocols known in the art.

Nodes 200 can each provide file-level service such as used in a network-attached storage (NAS) environment, block-level service such as used in a storage area network (SAN) environment, a service providing both file-level and block-level access, or any another service capable of providing other object-level access. Illustratively, each node 200 includes various functional components that operate to provide a distributed architecture of a storage server in cluster 100. To that end, each node 200 is generally organized as a set of modules including a network element (network module 310A, 310B), a data element (data module 350A, 350B), and a management element (management host 301A, 301B), for carrying out storage server operations. Illustratively, network module 310 (network module 310A, 310B) includes functionality to enable node 200 to connect to client 180 via network 140. In contrast, data module 350 (data module 350A, 350B) connects to one or more disks 130 directly across a fiber channel interconnect for example, or via a cluster switching fabric 155, which may also be a fiber channel interconnect, for servicing client requests targeted for disks 130. Additionally, management host 301A, 301B provides cluster services for respective nodes 200 to coordinate operations between nodes configured in cluster 100.

In one embodiment, an operating system operative in data module 350 logically organizes storage in disks 130 as storage objects such as files, directories, volumes, and aggregates. Client requests received by node 200 (e.g., via network module 310) may include a unique identifier such as an object ID to indicate a particular storage object on which to carry out the request. Preferably, only one of the data modules owns each of the storage objects on disks 130. For instance, a storage object may be stored on disks 130A, and may be controlled by data module 350A. A storage request targeted for the storage object may then be received by either network module 310A or network module 310B and forwarded to data module 350A via cluster switching fabric 150 for servicing.

Also operative in node 200 is an management host (management host 301A, 301B) which provides cluster services for node 200 by managing a data structure such as a replicated database, RDB (shown in FIG. 2), containing cluster-wide configuration information used by node 200. The various instances of the RDB in each of the nodes may be updated periodically by the management host to bring the RDB into synchronization with each other. Synchronization may be facilitated by the management host updating the RDB for node 200 and providing the updated information to the M hosts management hosts of other nodes (e.g., across cluster switching fabric 150) in the cluster. In one embodiment, the replicated database (RDB) stores storage object information used by node 200 to determine which data module 350 owns each of the storage objects.

It should be noted that while FIG. 1 shows an equal number of N- and D modules constituting a node in the illustrative system, there may be different number of such modules constituting a node in accordance with various embodiments of the disclosed subject matter. For example, there may be a number of network modules and data modules of node 200A that does not reflect a one-to-one correspondence between the N- and data modules of node 200B. As such, the description of a node comprising only one network and data module for each node 200 should be taken as illustrative only. In addition, certain other embodiments of storage system 100 may include more than two nodes so the disclosed subject matter is not so limited to the exemplary description provided with respect to FIG. 1.

In yet other embodiments, nodes 200 may implement network subsystems which provide networked storage services for a specific application or purpose. Examples of such applications may include database applications, web applications, Enterprise Resource Planning (ERP) applications, etc., e.g., implemented in a client. Examples of such purposes may include file archiving, backup, mirroring, etc., provided, for example, on archive, backup, or secondary storage systems connected to a primary storage system. A network subsystem can also be implemented with a collection of networked resources provided across multiple nodes and/or storage subsystems.

As shown in FIG. 1, a cluster manager 400 performs cluster services for cluster 100 to coordinate activities between nodes 200. In one embodiment, cluster manager 400 may be a conventional personal computer (PC), server-class computer, workstation, handheld computing or communication device, or other special or general purpose computer in some embodiments. In other embodiments, cluster manager 400 may be implemented as one or more functional components within other computing devices in cluster 100 and may, for instance, be implemented within any of nodes 200 for coordinating cluster services provided by the nodes. Cluster services may include presenting a distributed storage system image (e.g., distributed file system image) for the cluster and managing the configuration of the nodes, for instance. To that end, a data structure such a volume location database, VLDB (shown in FIG. 4), may be managed by cluster manager 400 for centralized storage of information related to storage objects in the cluster and the data modules owning respective storage objects. Management element management host 301C operative in cluster manager 400 may then communicate with the management hosts of the nodes (e.g., management host 301A, 301B) to ensure that information stored in the various instances of the RDBs are synchronized with information in the VLDB.

Illustratively, cluster 100 implements a novel migration system 500 for transparently migrating an aggregate between nodes 200. Advantageously, aggregates may be migrated between nodes 200 to distribute processing load among nodes 200 or to otherwise change ownership of an aggregate from a source node (e.g., node 200A) to a destination node (e.g., node 200B) for performing maintenance or upgrade operations at the source node, for instance, which would otherwise preclude the source node from servicing the aggregate during such operations. Portions of system 500 may be implemented in nodes 200 and cluster manager 400 for carrying out operations at each of the respective devices in accordance with certain embodiments of the disclosed subject matter. In operation, system 500 may receive a migration request at cluster manager 400 which involves migrating an aggregate on disks 130A owned by data module 350A of node 200A to node 200B. The request may then be forwarded to node 200A across cluster switching fabric 150 as indicated in the VLDB, where it is received by data module 350A via cluster switching fabric 150.

Upon receipt, data module 350A may communicate with data module 350B to verify that data module 350B is configured to service the aggregate. Based on the verifying, data module 350A offlines the aggregate to halt servicing of the aggregate and updates the ownership information of the aggregate. Upon the updating, the aggregate may be onlined by data module 350B to resume service to the aggregate at data module 350B. data module 350B further sends the updated aggregate configuration to cluster manager 400, which synchronizes the updated aggregate configuration with the replicated databases (RDBs) in each of nodes 200. A request targeted for the aggregate may then be received by either of network modules 310 and forwarded to data module 350B based on the synchronized RDBs.

Computer Architecture

Figure 2:
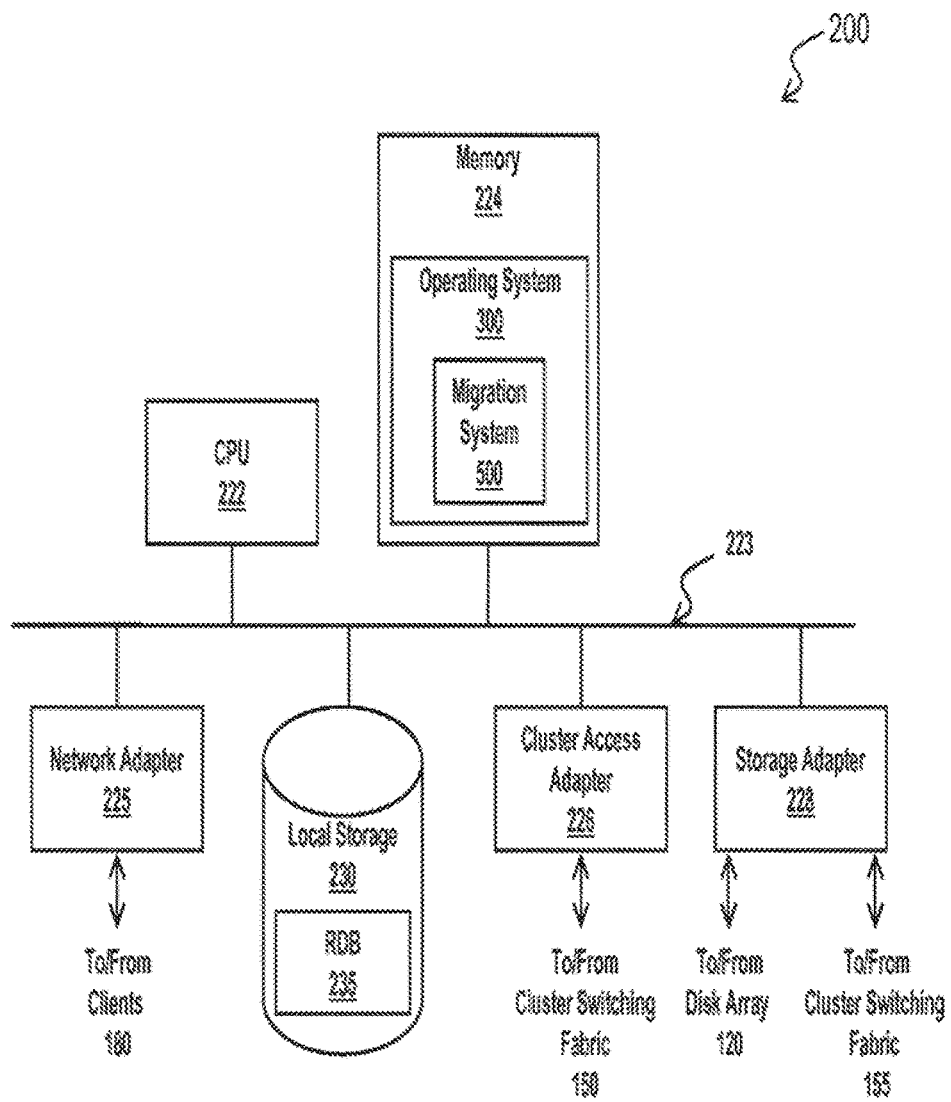
FIG. 2 is a block diagram of an illustrative embodiment of special- or general-purpose computer implementing aspects of a node from FIG. 1 according to various embodiments of the disclosed subject matter.

FIG. 2 is a schematic block diagram of a node (e.g., node 200) embodied as a general- or special-purpose computer comprising a processor 222, a memory 224, a network adapter 225, a cluster access adapter 226, a storage adapter 228 and a local storage 230 interconnected by a system bus 223. Cluster access adapter 226 may comprise one or more ports adapted to couple the node to other nodes in a cluster (e.g., cluster 100). In the illustrative embodiment, Ethernet is used as the clustering protocol and interconnect media, although it will be apparent to those skilled in the art that other types of protocols and interconnects may be utilized within the cluster architecture described herein.

Local storage 230 comprises one or more storage devices, such as disks or flash memory, utilized by the node to locally store cluster-wide configuration information in a data structure such as replicated database (RDB) 235. In contrast, memory 224, which may store RDB 235 in other embodiments, comprises storage locations addressable by processor 222 and adapters 225, 226, 228 for storing program instructions and data structures associated with the disclosed subject matter. Processor 222 and adapters 225, 226, 228 may, in turn, comprise processing elements and/or logic circuitry configured to execute program instructions and manipulate data structures. A storage operating system 300, portions of which is typically resident in memory 224 and executed by the processing elements (e.g., processor 222), functionally organizes the node by invoking storage operations in support of the storage services implemented by the node. It will be apparent to those skilled in the art that other processing and memory means, including various computer readable media, may be used for storing and executing program instructions pertaining to the inventive subject matter described herein.

Network adapter 225 comprises one or more ports adapted to couple the node to one or more clients (e.g., client 180) over point-to-point links, wide area networks, virtual private networks implemented over a public network (Internet) or a shared local area network. Network adapter 225 thus may comprise the mechanical, electrical and signaling circuitry needed to connect the node to network 140, for instance. Each client may communicate with the node over the network by exchanging discrete frames or packets of data according to pre-defined protocols, such as TCP/IP.

Storage adapter 228 cooperates with storage operating system 300 executing on the node to access information requested by the clients. The information may be stored on any type of attached array of storage devices (e.g., array 120) such as tape, disks, flash memory and any other similar media adapted to store information. Preferably, storage adapter 228 comprises a plurality of ports having input/output (I/O) interface circuitry that couples to the disks over an I/O interconnect arrangement, such as a conventional high-performance, FC link topology. Illustratively, storage arrays in the cluster are configured as a storage subsystem providing a shared storage pool of the cluster. The node may then access the storage arrays either directly via storage adapter 228 or indirectly via cluster access adapter 226.

Portions of a novel migration system (e.g., system 500) are further operative in storage operating system 300 for transparently migrating an aggregate owned by one node to another node. System 500 may be implemented as instructions stored in memory 224 and executed by processor 222, in one embodiment. Functionality of system 500 for communicating with a cluster manager (e.g., cluster manager 400) and carrying out inter-nodal communications in the cluster may be performed via cluster adapter 226. Preferably, ownership information for each aggregate may be stored as metadata for the aggregate stored in an identifiable location within the aggregate and accessible via storage adapter 228. It will be apparent to those skilled in the art that other processing and memory means, including various computer readable media, may be used for storing and executing program instructions pertaining to the inventive subject matter described herein.

To facilitate access to the storage subsystem, storage operating system 300 implements a file system, such as a write-anywhere file system, that cooperates with one or more abstraction layers to "virtualize" the storage space provided by the storage subsystem. The file system logically organizes the information as a hierarchical structure of storage objects such as named directories and files on the disks. Each file may be implemented as set of data blocks configured to store information whereas the directory may be implemented as a specially formatted file in which names and links to other files and directories are stored. The abstraction layer allows the file system to further logically organize information as a hierarchical structure of blocks that are exported as named logical unit numbers (luns) in certain embodiments.

In the illustrative embodiment, storage operating system 300 is preferably the NetApp® Data ONTAP® operating system available from NetApp, Inc., Sunnyvale, Calif., that implements a Write Anywhere File Layout (WAFL®) file system. However, it is expressly contemplated that any appropriate storage operating system may be enhanced for use in accordance with the inventive principles described herein. As such, where the term "WAFL" is employed, it should be taken broadly to refer to any abstraction layer or system that is otherwise adaptable to the teachings of this inventive subject matter.

Storage Operating System

Figure 3:
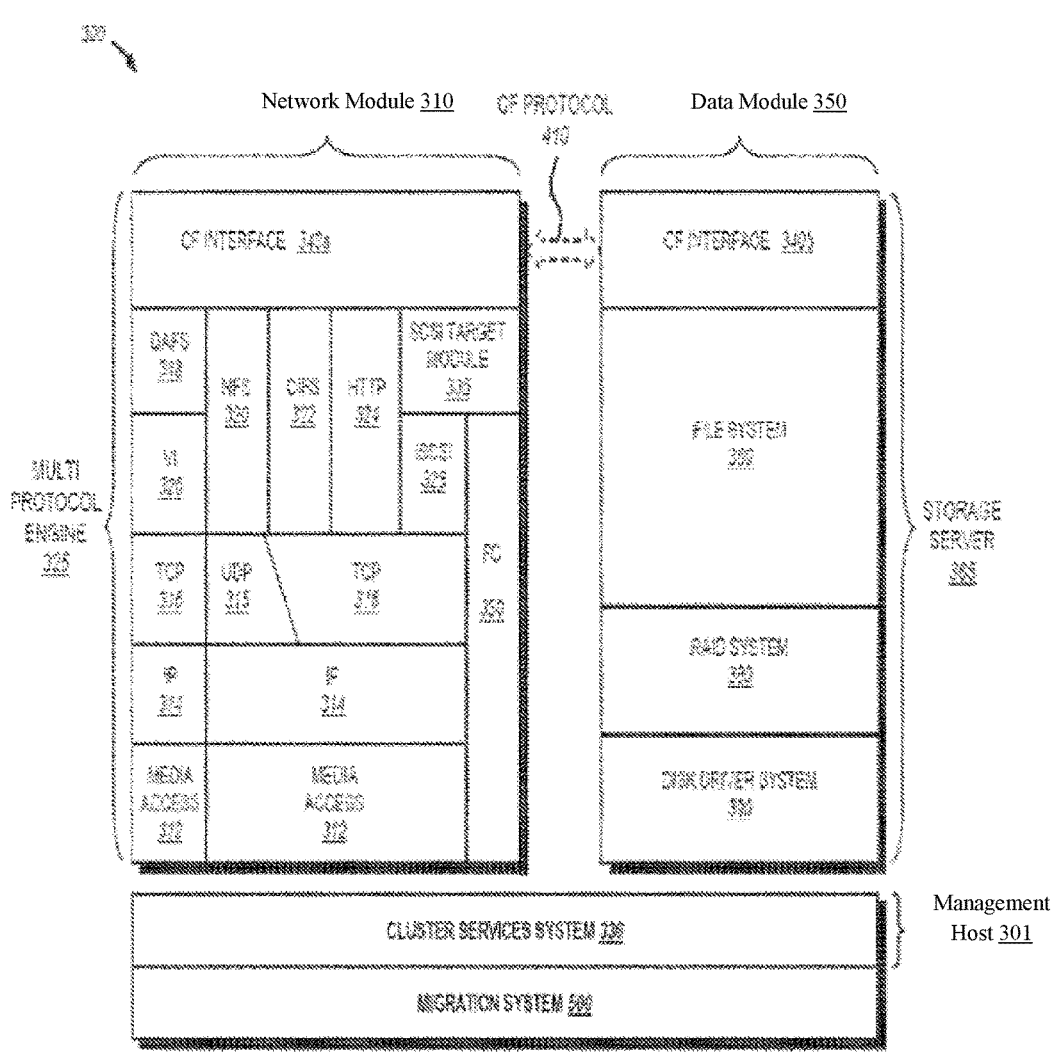
FIG. 3 is a schematic block diagram of a storage operating system that may be advantageously used with the disclosed subject matter.

FIG. 3 is a schematic block diagram of a storage operating system (e.g., storage operating system 300) that may be advantageously used with the disclosed subject matter. The storage operating system comprises a series of software layers executed by a processor (e.g., processor 222) and organized to form an integrated network protocol stack or, more generally, a multi-protocol engine 325 that provides data paths for clients to access information stored on the node using block and file access protocols.

Multi-protocol engine 325 includes a media access layer 312 of network drivers (e.g., gigabit Ethernet drivers) that interface with network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide respective FC- and iSCSI-specific access control to the blocks and, thus, manage exports of luns to either iSCSI or FCP or, alternatively, to both iSCSI and FCP when accessing blocks on the node.

To provide operations in a support of cluster services for the node, a cluster services system 336 may also be implemented in the storage operating system as a software layer executed by the processor of the node. System 336 may generate information sharing operations for providing a high-level, distributed file system image across nodes in the cluster. In one embodiment, media access layer 312 receives information in the form of a packet from a cluster manager (e.g., cluster manager 400) which may be processed by IP layer 314 or TCP layer 316, for instance. The processed packet may then be forwarded to system 336, for example, to synchronize an RDB (e.g., RDB 235) of the node by updating the RDB with information contained in the packet from the cluster manager. Similarly, system 336 may provide information related to local configuration updates to the cluster manager by generating packets to be provided by media access layer 312 to the cluster manager.

The storage operating system also includes a series of software layers organized to form a storage server 365 that provides data paths for accessing information stored on disks (e.g., disks 130) attached of the node. Storage of information is preferably implemented as one or more storage objects that comprise a collection of disks cooperating to define an overall logical arrangement. In one embodiment, the logical arrangement may involve logical volume block number (vbn) spaces, wherein each aggregate is associated with a unique vbn.

The underlying disks constituting the vbn space are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of parity information with respect to the striped data. An illustrative example of a RAID implementation is a RAID-DP® implementation available from NetApp, Inc., Sunnyvale, Calif., although it should be understood that other types and levels of RAID implementations may be used in accordance with the inventive principles described herein. To that end, the node may include a file system module 360 in cooperation with a RAID system module 380 and a disk driver system module 390. RAID system 380 manages the storage and retrieval of information to and from aggregates on the disks in accordance with I/O operations, while disk driver system 390 implements a device access protocol such as, e.g., the SCSI protocol.

File system 360 implements a virtualization system of the storage operating system through the interaction with one or more virtualization modules illustratively embodied as, e.g., a SCSI target module 335. The virtualization module enables access by administrative interfaces, such as a command line or graphical user interface, in response to an administrator issuing commands to the node (e.g., network module). SCSI target module 335 is generally disposed between drivers 328, 330 and file system 360 to provide a translation layer of the virtualization system between the block (lun) space and the file system space, where luns are represented as blocks.

File system 360 illustratively implements the WAFL file system having an on-disk format representation that is block-based using, e.g., 4 kilobyte (KB) blocks and using index nodes ("inodes") to identify files and file attributes (such as creation time, access permissions, size and block location). File system 360 uses files to store metadata describing the layout of its file system, including an inode file. A file handle (i.e. an identifier that includes an inode number) is used to retrieve an inode from the disk.

Broadly stated, all inodes of file system 360 are organized into the inode file. A file system (fs) info block specifies the layout of information in the file system and includes an inode of a file that includes all other inodes of the file system. Each aggregate has an fsinfo block that is stored at an identifiable location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from a client is forwarded as a packet over the network and onto the node where it is received at a network adapter (e.g., adapter 225). A network driver such as layer 312 or layer 330 processes the packet and, if appropriate, passes it on to a network protocol and file access layer for additional processing prior to forwarding to file system 360. Here, file system 360 generates operations to load (retrieve) the requested data from the disks if it is not resident "in core", i.e., in memory 224. If the information is not in memory, file system 360 indexes into the inode file using the inode number to access an appropriate entry and retrieve a logical vbn. The file system then passes a message structure including the logical vbn to the RAID system 380; the logical vbn is mapped to a disk identifier and device block number (e.g., disk,dbn) and sent to an appropriate driver (e.g., SCSI) of disk driver system 390. The disk driver accesses the dbn from the specified disk and loads the requested data block(s) in memory 224 for processing by the node. Upon completion of the request, the node (and operating system 300) returns a reply to the client over the network.

It should be noted that the software "path" through the storage operating system layers described above needed to perform data storage access for the client request received at the node adaptable to the teachings of the inventive subject matter may alternatively be implemented in hardware. That is, in an alternate embodiment of the inventive subject matter, a storage access request data path may be implemented as logic circuitry embodied within a field programmable gate array (FPGA) or an application specific integrated circuit (ASIC). This type of hardware implementation increases the performance of the storage service provided by the node in response to a request issued by a client. Moreover, in another alternate embodiment of the inventive subject matter, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the inventive subject matter described herein may apply to any type of special-purpose (e.g., file server, filer or storage serving appliance) or general-purpose computer, including a standalone computer or portion thereof, embodied as or including a storage system. Moreover, the teachings of this inventive subject matter can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the disclosed subject matter may be utilized with any suitable file system, including conventional write in place file systems.

CF Protocol

In the illustrative embodiment, a node is embodied as data module 350 of the storage operating system 300 to service one or more aggregates on disk. In addition, multiprotocol engine 325 is embodied as network module 310 to perform protocol termination with respect to a client issuing incoming data access request packets over the network, as well as to redirect those data access requests to any node in the cluster. System 336 further implements an management host (e.g., management host 301) to provide cluster services for providing a distributed file system image for the cluster. To that end, the modules of the node cooperate to provide a highly-scalable, distributed storage system architecture of the cluster.

Illustratively, a cluster fabric (CF) interface module 340 (CF interface modules 340A, 340B) may be adapted to implement intra-cluster communication between the modules within the cluster for storage system operations described herein. Such communication may be effected by a data module exposing a CF application programming interface (API) to which network module (or another data module) issues calls. To that end, a CF interface module 340 can be organized as a CF encoder/decoder. The CF encoder of, e.g., CF interface 340A on network module 310 can encapsulate a CF as (i) a local procedure call (LPC) when communicating a file system command to a data module 350 residing on the same node or (ii) a remote procedure call (RPC) when communicating the command to a data module residing on a remote node of the cluster (e.g., via cluster switching fabric 150). In either case, the CF decoder of CF interface 340B on data module 350 deencapsulates the CF message and processes the file system command.

Notably, functionality in support of a distributed file system image for the cluster may be provided by system 336 indicating the appropriate data module 350 to which a client request should be forwarded. A client request received by network module 310 may be processed by system 336 for determining the data module owning the aggregate identified in the request. For instance, system 336 may access information stored in a replicated database (e.g., RDB 235) for making the determination. network module 310 may then generate a CF message to be delivered to the appropriate data module for carrying out the request. Thus, a network port of any network module may receive a client request and access any aggregate within the distributed file system image.

Further to the illustrative embodiment, each of the modules is implemented as separately-scheduled processes of storage operating system 300. However, in an alternate embodiment, portions of these modules may be implemented as executable instructions within a single operating system process. In yet other embodiments, each of the modules may be implemented in firmware, hardware, or a combination of processor-executed software in accordance with certain embodiments of the disclosed subject matter. For instance, each module may constitute at least a processor and memory for generating operations in support of its respective operations.

In FIG. 3, a novel migration system (e.g., system 500) is further operative in the storage operating system for effecting a transparent migration of an aggregate between a source and destination node. Illustratively, a migration request may be provided by the cluster manager (e.g., cluster manager 400) to the data module of the source node. The data module may then communicate with a data module of the destination node to verify that the destination data module is configured to service the aggregate, and to facilitate the change in ownership of the aggregate based on the verifying. The migration system further operates with system 336 to update configuration information in the RDB of the destination node and to synchronize the update across all the nodes.

Cluster Manager

Figure 4:
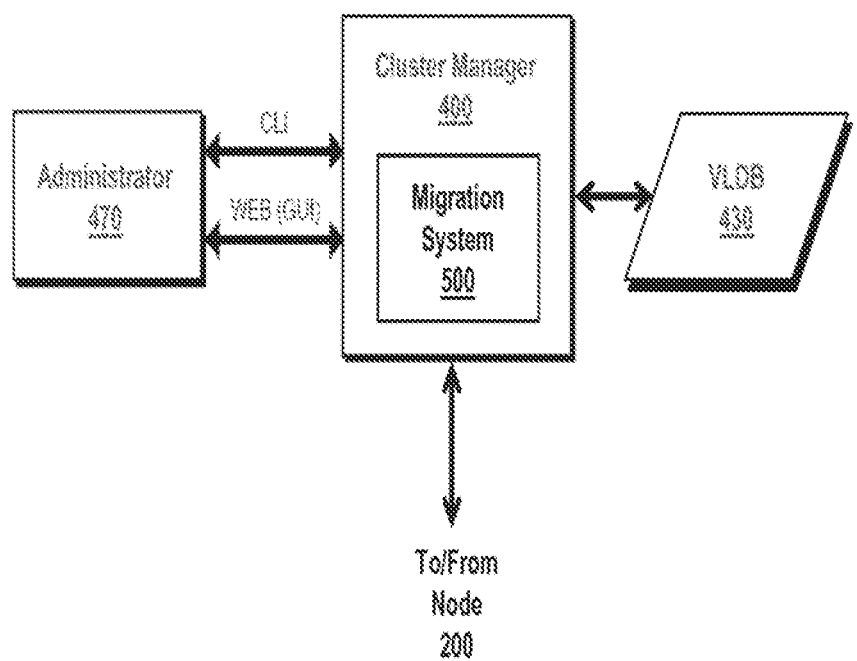
FIG. 4 is a schematic block diagram illustrating a cluster manager for coordinating cluster services between nodes in the clustered storage system of FIG. 1 during a migration operation in accordance with an embodiment of the disclosed subject matter.

FIG. 4 is a schematic block diagram illustrating a cluster manager (e.g., cluster manager 400 shown in FIG. 1) operative with a storage operating system of a node (e.g., storage operating system 300) to manage cluster services for a cluster (e.g., cluster 100). Preferably, the cluster manager is implemented in a computing device connected, e.g., via cluster switching fabric 150, to the nodes (e.g., nodes 200) in the cluster. To that end, the cluster manager may be implemented in a device including at least a processor, memory, and cluster access adapter for carrying out operations of the cluster manager. In other embodiments, however, it will be appreciated that the functional components of cluster manager may be implemented or distributed across various other devices in the cluster such as within a node (e.g., node 200), so the inventive subject matter is not so limited to the embodiment discussed herein.

Illustratively, the cluster manager manages a data structure such as a volume location database (VLDB) 430 and synchronizes the various instances of the replicated databases, RDB (e.g., RDB 235) across the nodes. Configuration information of the nodes, such as the storage objects owned by each node, may be tracked in a centralized location at the cluster manager using VLDB 430 to provide a distributed file system image to a client (e.g., client 180) to facilitate routing of client requests to nodes of the cluster. In the illustrative embodiment, VLDB 430 maps a storage object identifier such as an aggregate ID to the data module of the source node which owns the aggregate. The aggregate ID may be generated by a storage abstraction layer (e.g., file system layer 360 from FIG. 3) of a data module constructing the aggregate, for example. To that end, the data module constructing the aggregate may be the data module of the source for instance.

In addition, VLDB 430 includes a plurality of entries, each constituting at least an aggregate ID and a data module ID, which is accessed by the cluster manager when synchronizing the RDBs across the nodes. In other embodiments, VLDB 430 may include at least the aggregate ID and a node ID where each node includes only one data module. In yet other embodiments, an indicator other than a data module ID or node ID may be included in an entry of VLDB 430 for uniquely identifying the data module owning the aggregate. Illustratively, indicators such as the data module ID, node ID, or other unique identifier associated with the data module may be generated by the storage operating system of the node during initialization of the node or a component of the node. In this way, the cluster manager may access VLDB 430 when routing aggregate migration requests to a source node. Although VLDB 430 is discussed herein in reference to volumes, it will be appreciated that other embodiments of the illustrative data structure managed by the cluster manager for tracking the ownership of storage objects may involve tracking aggregates constituting one or more volumes or tracking other storage objects in accordance with teachings of the disclosed subject matter.

Synchronization of RDBs, in one embodiment, may be carried out by the cluster manager receiving updates from a node undergoing a configuration change. For instance, a configuration change may involve a node no longer servicing an aggregate or a node newly servicing an aggregate upon a migration operation. The node may then provide the updated information to the cluster manager, which is stored in VLDB 430. Thereafter, the cluster manager may provide the updated information to each of the RDBs of the nodes based on the information in VLDB 430. Alternatively, updates may be provided to the RDBs on a periodic basis (e.g., pre-determined time intervals) or in response to other events such as initialization of a new node. In this way, the RDB may be synchronized to reflect the current cluster configuration.

Preferably, an administrator 470 of the cluster interfaces with the cluster manager for requesting the migration of an aggregate to a destination node. Administrator 470 may interface with the cluster manager through command line interfaces or graphical user interfaces, for instance, to provide an aggregate ID and data module ID to which the aggregate should be migrated. In other embodiments, a migration request may be automatically generated by the cluster manager monitoring events in the cluster. For instance, an event may include a node achieving a network bandwidth threshold, a performance threshold, a storage threshold, or any other threshold for an operating characteristic of the node, and may be supplied by administrator 470 to the cluster manager. Network bandwidth may include the rate of data transfer through a given communication path, whereas performance threshold may include the amount of processing performed compared to the time and resources of the node used to carry out the processing. In contrast, storage threshold may include an available storage capacity or an amount of storage capacity already used by the node. Administrator 470 may also provide additional migration information such as an aggregate ID and destination data module ID (or node ID) for automatically performing the migration upon monitoring the event.

To that end, the cluster manager may carry out operations for monitoring the event by querying a node for information related to the event. One such operation may involve periodically requesting operating characteristic information from a node (e.g., via cluster switching fabric 150). Upon reaching the threshold for the operating characteristic, the cluster manager may automatically generate a request to migrate the indicated aggregate to the predetermined destination node and provide the request to the appropriate source node.

Migration System

Figure 5A:
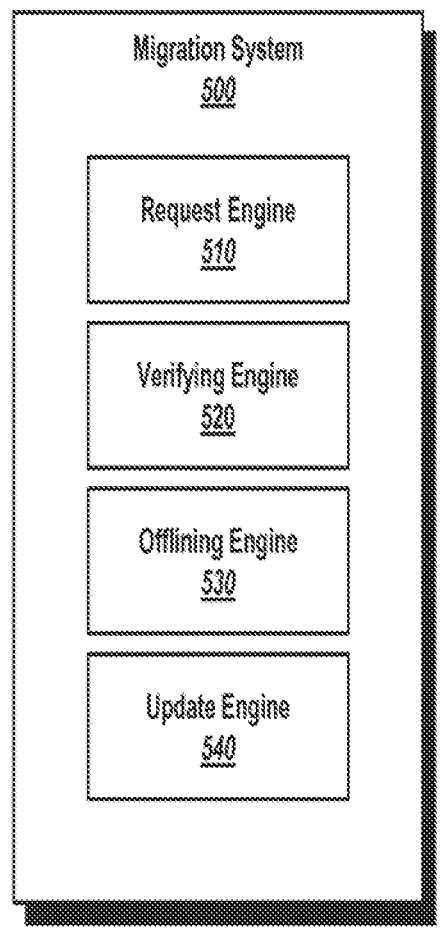
FIG. 5A is a schematic block diagram illustrating functional components of the novel migration system in which the disclosed subject matter may be implemented.

Shown in FIG. 5A is an exemplary embodiment of a novel migration system (e.g., system 500) implementing techniques of the disclosed subject matter. Preferably, the migration system may be embodied as one or more software-executing processors operative in the clustered nodes and cluster manager for implementing the functional components of the migration system. In other embodiments, aspects of the migration system may be implemented as firmware, hardware, or a combination of firmware, hardware, and software-executing processors in accordance with various embodiments of the inventive subject matter. Accordingly, it will be appreciated that the inventive subject matter is not so limited to the embodiment described herein.

Illustratively, components of the migration system include a request engine 510, a verifying engine 520, an offlining engine 530, and an update engine 540. Request engine 510 may receive a request to migrate an aggregate to a destination node when an administrator (e.g., administrator 470) interfaces with the cluster manager to initiate the migration operation. Alternatively, the request may be automatically generated by request engine 510 when the cluster manager monitors an event at a node, for instance. Upon the cluster manager monitoring the event, request engine 510 may retrieve from memory an aggregate ID and a destination data module ID, for example, supplied by the administrator at an earlier point in time. Whether receiving or generating a migration request, request engine 510 determines the node which presently owns the aggregate (source) and forwards the migration request to the source. In one embodiment, determination of the source may be performed by accessing the VLDB of the cluster manager (e.g., VLDB 430), retrieving the data module ID (or node ID) associated with the aggregate ID in the VLDB, and forwarding the migration request to the node associated with the retrieved node ID.

Verifying engine 520 performs operations in support of a source automatically verifying a configuration of the destination. Verifying the configuration may involve the source requesting (e.g., via cluster switching fabric 150) confirmation from the destination that the destination is configured to service the aggregate and the destination determining whether the destination is configured to service the aggregate. In one embodiment, the destination is configured to service the aggregate when the destination operates in accordance with a predetermined configuration. The predetermined configuration may involve one or more operating characteristics of the node required to service the aggregate. The predetermined configuration may be implemented as a data structure such as a configuration table (config table) stored in memory of the destination (e.g., memory 224 from FIG. 2), where each entry in the config table constitutes an operating characteristic for the predetermined configuration. FIG. 5B illustrates an exemplary config table 550 for storing the predetermined configuration of the destination which may be supplied by the administrator to a node during initialization, for example, or provided as part of the manufacturing process of the node.

One exemplary operating characteristic of config table 550 may involve the presence of a cluster quorum at a node as indicated by a field of config table 550, cluster_quorum 551. Presence of a cluster quorum at a node means that the node is operative to service storage requests. To determine whether the cluster quorum is present at the destination, verifying engine 520 may query the operating system of the destination to determine the operating mode of the destination. For instance, the destination operates in a "normal" mode when ordinary operations of a storage server, including servicing storage requests, are being carried out at the destination. At certain times, however, the destination may operate in "degraded mode" involving limited storage server functionality when a storage component fails or during routine upgrade and maintenance, for example. The modes may be set automatically by the storage operating system detecting a failure or receiving a request by the administrator to perform upgrade operations, for instance. When a failure is restored or an upgrade operation completes, the storage operating system of the node may automatically change the mode back to "normal," or alternatively, changes to the mode may be performed manually by the administrator. Upon querying the storage operating system and determining the destination is operative in the normal mode, a cluster quorum is considered present at the destination.

Other exemplary operating characteristics may include existence of a particular software version number (indicated by a field of config table 550, version_#552) and a current configuration which is not at maximum storage limits (indicated max_limit 553). The software version number may be verified by querying the operating system for a version and comparing the version provided by the querying to the version indicated in version_#552 of config table 550. Verifying engine 520 may also determine a storage limit status by querying the operating system for information related to the file system layer (e.g., file system 360), for instance. Illustratively, the file system layer operative at the destination may only manage a certain number of aggregates, so if managing an additional aggregate would exceed the capabilities of the file system then the destination would not be configured to service a migrated aggregate. To that end, verifying engine 520 may query the operating system for the maximum number of aggregates permitted by the file system layer and the current number of aggregates managed by the file system layer. If maximum number and the current number match, then verifying engine 520 determines that storage limits would be exceeded as a result of the migration operation. In these cases, verifying engine 520 would result in a failure to confirm a configuration of the destination. It will be appreciated that although the exemplary embodiment is discussed in relation to a file system and aggregates, other storage abstraction layers may be implemented by the storage operating system for determining the maximum and current number of storage objects managed by the storage abstraction layer in accordance with the teachings of the disclosed subject matter.

Yet another exemplary operating character may involve accessibility by the destination to all the disks of the aggregate as indicated by aggregate_access 554 in config table 550. In one embodiment, verifying engine 520 may determine the set of physical disks which constitute the aggregate by querying the source for such information. Using the list of disks provided by the source resulting from the querying, the destination may then attempt to access each disk indicated by the source. If the attempted access is successful (e.g., attempted disk access by the destination does not result in any "read" or other errors), then verifying engine 520 confirms that the destination is capable of accessing disks of the aggregate.

It will be appreciated that the novel migration system may implement all or none of the operating characteristics above constituting the predetermined configuration of the destination; but rather, or in addition to, other operating characteristics different from those described above may be included in the predetermined configuration when determining whether the destination is configured to service the aggregate as indicated by field 555. When the operating characteristics of config table 550 have been confirmed by verifying engine 520, the destination operates in accordance with the predetermined configuration and is thus configured to service the aggregate.

In certain embodiments, verifying engine 520 may further be operative to determine whether the source is configured to facilitate the migration operation. The source may be considered to be configured to facilitate the migration operation a proper operating condition exists at the source to permit migration. In one example, when other operations are not actively being performed on the aggregate which would otherwise be disrupted during a migration operation, then the proper operating conditions exists at the source to permit migration. In this way, the migration system may ensure that carrying out a migration operation on the aggregate will not interrupt other potentially critical operations being performed on the aggregate. Exemplary active operations precluding a migration operation may thus include operations in support of fault tolerance, maintenance, and servicing of access requests, for instance. In the event active operations are being performed on the aggregate, then proper operating conditions at the source do not exist thereby precluding a migration operation.

To that end, a veto check on the source may be invoked by verifying engine 520 to query one or more modules within the storage operation system of the source to determine whether certain operations are being performed on the aggregate. Verifying engine 520 may access a list of modules stored in a data structure (e.g., stored in memory 224) which indicates the particular modules to be queried. In one example, the RAID module (e.g. RAID system module 380) may be queried to determine whether operations such as mirroring data across disks, adding disks to the aggregate, recovering from a disk failure on which the aggregate resides, or other fault-tolerant operations are being performed on the aggregate to preclude migration. The file system module (e.g., file system module 390) may be queried to determine whether maintenance operations or servicing of an access request is actively being performed on the aggregate. Other modules of the storage operating system may also be queried in accordance with certain embodiments of the disclosed subject matter to determine whether other respective operations are actively being performed on the aggregate to preclude the migration operation. Preferably, if the modules return a response to the storage operating system indicating that no active operations are being performed on the aggregate, then proper operating conditions are considered to exist at the source permitting a migration operation. A result of the veto check then includes a negative response indicating operating conditions at the source permit the migration operation, whereas a positive response indicates active operations currently being carried out at the source thus precluding a migration operation.

In other embodiments, proper operating conditions at the source may be determined based on a state of the aggregate. The aggregate state may be implemented as an indictor associated with the aggregate (e.g., stored in memory 224) for indicating whether the aggregate may be migrated. It may be desirable for an aggregate to remain owned by the source due to optimal system performance, source configuration, or other operating conditions for which it may be preferable for the source to continue servicing the aggregate, for instance. Illustratively, the aggregate state may be supplied by the administrator interfacing with the source at a user console of the source (e.g., using command line or graphical user interfaces), or may automatically be set by the storage operating system of the source managing the aggregate. For instance, the storage operating system may automatically set the aggregate state based on a particular characteristic of the source storage server or the aggregate itself which may be supplied by the administrator upon initializing the source storage server or programmed by a manufacturer of the storage server.

Illustratively, the aggregate may be associated with a first indicator (e.g., "no") indicating that migration is not permitted or a second indicator (e.g., "yes") indicating that migration is permitted. It will be appreciated that different aggregate states and/or indicators may be implemented in accordance with other embodiments so the disclosed subject matter is not limited to the exemplary descriptions provided herein. To determine proper operating conditions at the source based on an aggregate state, a veto check may be performed by verifying engine 520 involving accessing the location of the indicator for the aggregate state to determine whether the aggregate state permits migration. When the aggregate state permits migration, the source is thus considered to have a proper operating condition for permitting migration.

Offlining engine 530 also operative in the migration system offlines the aggregate to ensure that data of the aggregate does not change during the migration. In one embodiment, offlining involves denying storage requests from clients so data of the aggregate does not change during a migration process. To that end, upon a client request to access the aggregate on disk, offlining engine 530 may respond to the request with an error or failure message. In other embodiments, client requests may be cached in memory (e.g., memory 224) at the source until the destination takes ownership of the aggregate. For example, responsive to an update to the local RDB indicating the destination as the new owner of the aggregate, offlining engine 530 may forward the cached client requests to the destination for servicing by the destination.

Figure 6:
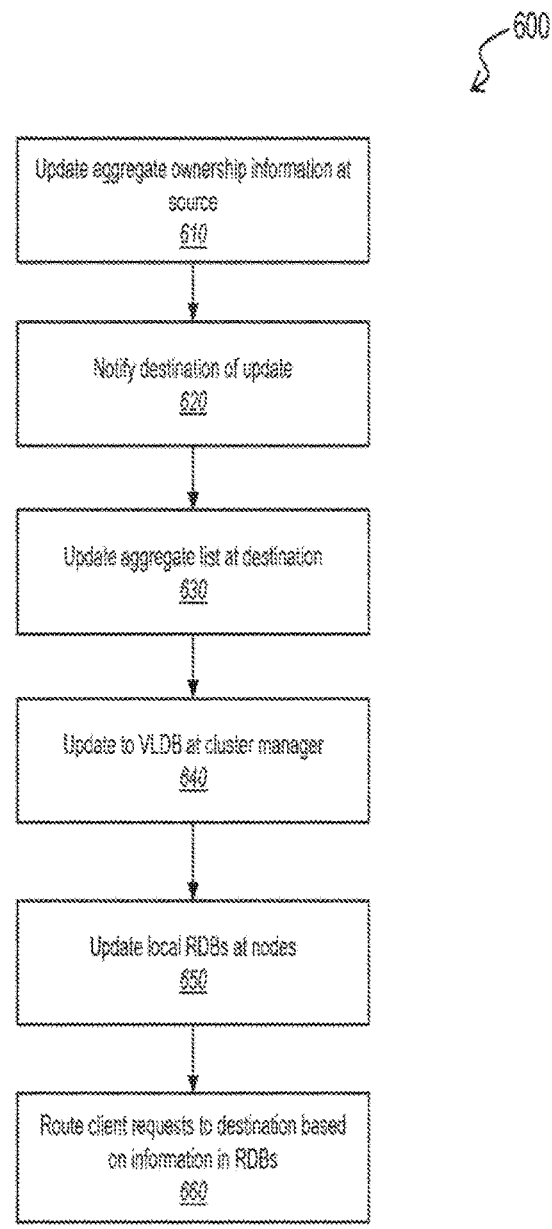
FIG. 6 illustrates an exemplary flow diagram for onlining an aggregate at the destination in accordance with an embodiment of the disclosed subject matter.

Illustratively, update engine 540 performs operations in support of onlining the aggregate at the destination to resume servicing of the aggregate at the destination. FIG. 6 illustrates a flow diagram 600 of an exemplary processes performed by update engine 540 to online the aggregate at the destination. At block 610, update engine 540 operative at the source modifies the ownership information of the aggregate to enable servicing of the aggregate by the destination. Ownership information may be stored (e.g., on disk 130 of FIG. 1) in metadata of the aggregate in an identifiable location within the aggregate. Metadata describes information about the user data stored in the aggregate and may include a data module ID of the source node which owns the aggregate, for instance. In one embodiment, ownership information may be stored to a metadata location by the file system of the data module (e.g., file system 360) upon creation of the aggregate. In other embodiments, ownership information may be stored in a metadata location on disk by the storage operating system (e.g., storage operating system 300) accessing the identifiable location. Ownership information is therefore updated by the source accessing the identifiable metadata location of the aggregate and modifying the data module ID to indicate the destination data module instead of the source data module.

Thereafter, update engine 540 may be operative to send a message from the source node to the destination node to notify the destination of the update upon completion of the update (block 620). Responsive to the notification, update engine 540 operative at the destination reads the metadata for the aggregate to verify that the destination is indicated therein. The notification may also include, for instance, the physical location of the aggregate (e.g., on disks 130) to provide such information from the source to the destination. At block 630, the file system of the destination updates its list of aggregates to include the new aggregate. Update engine 540 may then send an update request to the cluster manager to update the aggregate ownership information in the VLDB (block 640). In one embodiment, upon detecting a change, the cluster manager sends a request to the various management hosts (e.g., management host 301) in the cluster to update the local instances of the RDBs (block 650). Alternatively, the updated configuration information may be sent by the cluster manager to each of the nodes on a predetermined periodic basis as supplied by the storage administrator. In certain embodiments where offlining engine 530 caches client requests during migration, store client requests may also be forwarded by offlining engine 530 upon an update to the RDB at the source.

Upon updating the local instances of the RDBs, client requests for the aggregate may be received by any of the nodes and forwarded to the destination rather than the source in accordance with the updated aggregate ownership information (block 660). Since the destination is now operative to service requests on the aggregate, the aggregate is considered to be "online" at the destination thereby resuming servicing of the aggregate at the destination. Advantageously, the client need not perform any additional tasks such as processing ownership information at the client to ensure the request is directed to the appropriate node. Additionally, since verifying engine 520 confirms that the destination is configured to service the aggregate prior to an actual migration, resources of the clustered node need not be specifically configured to enable a transparent migration.

Transparently Migrating an Aggregate

Figure 7:
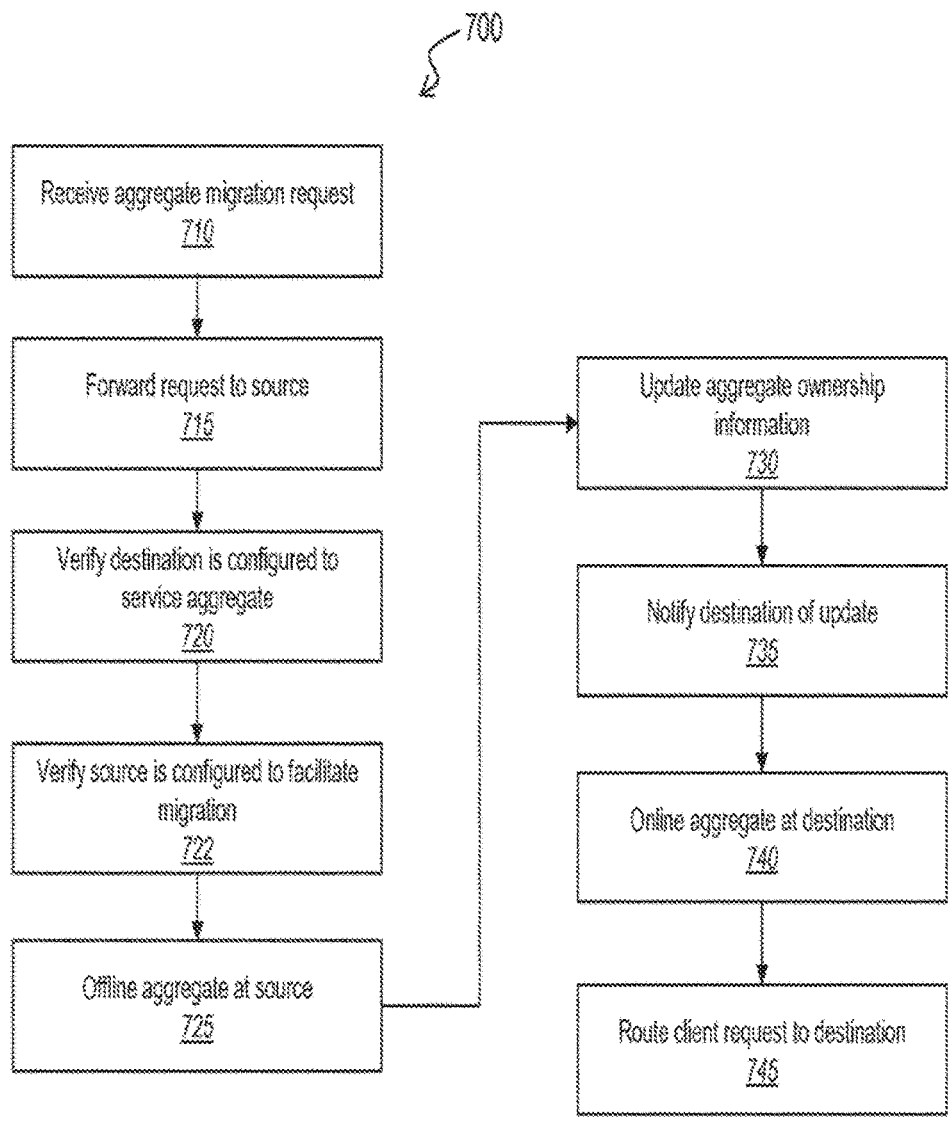
FIG. 7 illustrates an exemplary flow diagram for transparently migration an aggregate between nodes in a clustered storage system according to various embodiments of the disclosed subject matter.

FIG. 7 illustrates a flow diagram of an exemplary process 700 for transparently migrating an aggregate between a source (e.g., node 200A) and destination (e.g., node 200B) in a cluster (e.g., cluster 100). Illustratively, a novel migration system (e.g., system 500) carries out operations in support of automatically verifying the destination is configured to service the aggregate and updating ownership information of the aggregate based on the verifying to enable servicing of the aggregate by the destination.

At block 710, a request to migrate an aggregate to a destination is received by a request engine (e.g., request engine 510) of the migration system. The request may include an aggregate ID and a destination node ID for indicating the destination to which the aggregate should be migrated. Alternatively, the request engine may automatically generate a request based on a cluster manager monitoring an event. Information of the migration may be provided by an administrator (e.g., administrator 470) of the cluster at an earlier point in time, and retrieved from memory when the event is monitored. The request engine further processes the request by determining the node which owns the aggregate. Here, the VLBD of the cluster manager may be accessed by the request engine for retrieving a data module ID associated with the aggregate. The request may then be forwarded by the request engine (block 715) to the data module of the source.

Upon receipt of the request, a verifying engine (e.g., verifying engine 520) of the migration system automatically verifies that the destination is configured to service the aggregate (block 720). In one embodiment, verification involves determining whether a destination is configured in accordance with a predetermined configuration. For instance, the predetermined configuration may be stored in instances of a config table stored in each of the nodes for indicating one or more operating characteristics of the node required in order to service the aggregate. Exemplary operating characteristics may include operating in a cluster quorum and operating with a particular operating system version. Illustratively, the verifying engine performs the task of determining at the destination whether each operating characteristic has been met. Based on whether all the operating characteristics have been met, the verifying engine may respond to the verification request (e.g., via a message across the network) either a positive or negative response to the source.

In certain embodiments, the verifying engine may further be operative to determine the source is configured to facilitate a migration operation (block 722). For example, the verifying engine may invoke a veto check at the source to determine that active operations are not being performed on the aggregate, thereby permitting the aggregate to be migrated to the destination. Here, the RAID layer and file system layer may be queried, for instance, at the source to indicate that no operations are being performed by the respective layers on the aggregate. A negative result from the veto check thus indicates the source is properly configured to facilitate the migration operation.

Upon determining the source and destination are respectively configured to facilitate the migration operation and service the aggregate, the source may offline the aggregate (block 725) to avoid further updates to the aggregate while ownership information is updated. Here, an offlining engine (e.g., offlining engine 530) operative in the migration system denies requests to the aggregate or, in other cases, caches requests in memory until the aggregate is onlined at the destination. When the aggregate is later onlined, the offlining engine may supply the stored requests to the destination for servicing by the destination.

At block 730, ownership information of the aggregate may be updated by an update engine (e.g., update engine 540) to indicate the destination instead of the source. The updating may be performed at the source followed by a notification to the destination that an update was performed (block 735). The update may be performed by the update engine accessing an identifiable location storing metadata of the aggregate to modify the data module ID to reference the destination instead of the source.

In response to receiving the update notification from the source, the update engine may online the aggregate at the destination (block 740) by accessing the metadata of the aggregate at the destination. The file system of the destination may then update the list of aggregates managed at the destination based on reading the updated metadata of the aggregate. An update request is further sent from the destination to cluster manager to update information in the VLDB to indicate the new ownership information of the aggregate. Information in the RDBs may also be updated by the cluster manager providing the update to the various nodes. The aggregate and its constituent volumes are thereby onlined at the destination since the destination is operative to service requests on the aggregate.

When the cluster receives a request targeted for the aggregate, the requests may then be directed to the destination (block 745) following a migration operation. To that end, any node in the cluster may receive the requests and access its instance of the RDB to determine that the destination now owns the node. The request may then be forwarded to the destination for servicing. In this way, migration operations may be transparently performed since the client need not keep track of aggregate ownership information and may simply continue issuing storage requests to the cluster regardless of which node owns the aggregate.

By implementing the novel techniques, aggregate migration may be performed more efficiently to overcome the deficiencies of conventional copy operations and zero-copy migration techniques. Since the nodes in the cluster are configured to redirect a storage request to the appropriate destination, migration operations do not require further processing and management tasks by the client after a migration operation. Migration may be performed as between any of the nodes regardless of whether the nodes are pre-configured as a result of the source node automatically verifying the destination is configured to service the aggregate prior to a migration operation. Unwieldy configuration tasks by the administrator are also reduced to provide a scalable storage system which meets the changing needs of the administrator. In this way, the novel techniques may optimize use of system resources and provide improved system performance for carrying out storage operations.

Although the disclosed subject matter for purpose of explanation has been described with reference to specific exemplary embodiments, it will be understood that the inventive subject matter is not limited to the embodiments described. A person of ordinary skill in the art would understand that the disclosed subject matter can be practiced with modifications and alternations to those embodiments or can be practiced in other embodiments within the spirit and scope of the appended claims.

Moreover, non-dependent acts may be performed in parallel. The embodiments were chosen and described in order to best explain the principles of the inventive subject matter and its practical applications, to thereby enable others skilled in the art to best utilize the inventive subject matter and various embodiments with various modifications as are suited to the particular use contemplated.

Furthermore, the use of the phrase "one embodiment" throughout does not necessarily mean the same embodiment. Although these particular embodiments of the inventive subject matter have been described, the inventive subject matter should not be limited to these particular embodiments. Accordingly, the specification and drawings are to be regarded in an illustrative sense rather than a restrictive sense.

Unless specifically stated otherwise, it is to be appreciated that throughout the discussions utilizing terms such as "processing" or "computing" or "calculating" or "determining" or the like refer to the action and processes of a computer system or similar electronic computing device that manipulates and transforms data represented as physical (e.g. electronic) quantities within the computer systems registers and memories into other data similarly represented as physical quantities within the computer system.

The disclosed subject matter can be implemented by an apparatus for performing the operations herein. This apparatus may be specially constructed for the required purposes or it may comprise a machine, such as a general purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g. electronic) data structures and each coupled directly or indirectly to a computer system bus (or the like) for access. Each of these media may be coupled to a computer system bus through use of an appropriate device for reading and or for writing the media.

Use of the phrase "at least one of . . . or" should not be construed to be exclusive. For instance, the phrase "X comprises at least one of A, B, or C" does not mean that X comprises only one of {A, B, C}; it does not mean that X comprises only one instance of each of {A, B, C}, even if any one of {A, B, C} is a category or sub-category; and it does not mean that an additional element cannot be added to the non-exclusive set (i.e., X can comprise {A, B, Z}.

What is claimed is:

1. A method comprising:
receiving, by a computing device, a request to migrate servicing for a logical organization of a plurality of storage objects to a destination storage server;
querying, by the computing device, the destination storage server to identify one or more operating characteristics of the destination storage server prior to migrating servicing of logical organization of the plurality of storage objects, wherein the one or more operating characteristics is associated with one or more configurations of the destination storage server;
verifying, by the computing device, when the one or more operating characteristics satisfy one or more conditions required to migrate the logical organization of the plurality of storage objects to the destination storage server;
determining, by the computing device, when the destination storage server is capable to migrate the logical organization of the plurality of storage objects, when the verifying indicates that the one or more operating characteristics satisfy the one or more conditions required to migrate the logical organization; and
halting, by the computing device, any process associated with the logical organization of the plurality of storage objects and modifying ownership metadata for the logical organization to indicate ownership of the logical organization by the destination storage server, when the determination indicates that the destination storage server is capable to migrate the logical organization.

2. The method of claim 1 further comprising receiving, by the computing device, the request to migrate servicing for the logical organization from a cluster manager device.

3. The method of claim 1 further comprising determining, by the computing device, when one or more specified operations are not being performed on the logical organization prior to halting the migrate servicing for the logical organization, wherein the specified operations comprise a fault tolerance operation, a maintenance operation, or an access request servicing operation.

4. The method of claim 1, further comprising:
starting, by the computing device, any halted processes associated with the logical organization of the plurality of storage objects at the destination storage server upon determining the ownership metadata for the logical organization indicates ownership of the logical organization by the destination storage server.

5. The method of claim 1, wherein the one or more operating characteristics of the destination storage server comprises an operating mode of the destination storage server, a storage limit of the destination storage server, or a software version of the another computing device and wherein the one or more conditions required to migrate the logical organization of the plurality of storage objects to the destination storage server comprises operating with a particular operating system version.

6. The method of claim 1, further comprising communicating, by the computing device, to a cluster manager device, that the migrate servicing for the logical organization has changed to the destination storage server, when the determining indicates that the destination storage server is capable of servicing the storage requests that target the logical organization.

7. A non-transitory machine readable medium having stored thereon instructions for performing a method comprising machine executable code which when executed by at least one machine, causes the machine to:
receive a request to migrate servicing for a logical organization of a plurality of storage objects to a destination storage server;
query the destination storage server to identify one or more operating characteristics of the destination storage server prior to migrating servicing of logical organization of the plurality of storage objects, wherein the one or more operating characteristics is associated-with one or more configurations of the destination storage server;
verify when the one or more operating characteristics satisfy one or more conditions required to migrate the logical organization of the plurality of storage objects to the destination storage server;
determine of when the destination storage server is capable to migrate the logical organization of the plurality of storage objects, when the verifying indicates that the one or more operating characteristics satisfy the one or more conditions required to migrate the logical organization; and
halt any process associated with the logical organization of the plurality of storage objects and modifying ownership metadata for the logical organization to indicate ownership of the logical organization by the destination storage server, when the determination indicates that the destination storage server is capable to migrate the logical organization.

8. The non-transitory machine readable medium of claim 7, wherein the machine executable code when executed by the machine further causes the machine to receive the request to migrate servicing for the logical organization from a cluster manager device.

9. The non-transitory machine readable medium of claim 7, wherein the machine executable code when executed by the machine further causes the machine to determine when one or more specified operations are not being performed on the logical organization prior to halting the migrate servicing for the logical organization, wherein the specified operations comprise a fault tolerance operation, a maintenance operation, or an access request servicing operation.

10. The non-transitory machine readable medium of claim 7, wherein the machine executable code when executed by the machine further causes the machine to:
start any halted processes associated with the logical organization of the plurality of storage objects at the destination storage server upon determining the ownership metadata for the logical organization indicates ownership of the logical organization by the destination storage server.

11. The non-transitory machine readable medium of claim 7, wherein the one or more operating characteristics of the destination storage server comprises an operating mode of the destination storage server, a storage limit of the destination storage server, or a software version of the another computing device and wherein the one or more conditions required to migrate the logical organization of the plurality of storage objects to the destination storage server comprises operating with a particular operating system version.

12. The non-transitory machine readable medium of claim 7, wherein the machine executable code when executed by the machine further causes the machine to communicate, to a cluster manager device, that the migrate servicing for the logical organization has changed to the destination storage server, when the determining indicates that the destination storage server is capable of servicing the storage requests that target the logical organization.

13. A computing device comprising:
   a memory containing machine readable medium comprising machine executable code having stored thereon instructions for performing a method of migrating storage objects in a clustered storage system; and
   a processor coupled to the memory, the processor configured to execute the machine executable code to cause the processor to:
      receive a request to migrate servicing for a logical organization of a plurality of storage objects to a destination storage server;
      query the destination storage server to identify one or more operating characteristics of the destination storage server prior to migrating servicing of logical organization of the plurality of storage objects, wherein the one or more operating characteristics is associated-with one or more configurations of the destination storage server;
      verify when the one or more operating characteristics satisfy one or more conditions required to migrate the logical organization of the plurality of storage objects to the destination storage server;
      determine when the destination storage server is capable to migrate the logical organization of the plurality of storage objects, when the verifying indicates that the one or more operating characteristics satisfy the one or more conditions required to migrate the logical organization; and
      halt any process associated with the logical organization of the plurality of storage objects and modifying ownership metadata for the logical organization to indicate ownership of the logical organization by the destination storage server, when the determination indicates that the destination storage server is capable to migrate the logical organization.

14. The computing device of claim 13, wherein the processor is further configured to execute the machine executable code to further cause the processor to receive the request to migrate servicing for the logical organization from a cluster manager device.

15. The computing device of claim 13, wherein the processor is further configured to execute the machine executable code to further cause the processor to determine when one or more specified operations are not being performed on the logical organization prior to halting the migrate servicing for the logical organization, wherein the specified operations comprise a fault tolerance operation, a maintenance operation, or an access request servicing operation.

16. The computing device of claim 13, wherein the processor is further configured to execute the machine executable code to further cause the processor to:
   start any halted processes associated with the logical organization of the plurality of storage objects at the destination storage server upon determining the ownership metadata for the logical organization indicates ownership of the logical organization by the destination storage server.

17. The computing device of claim 13, wherein the one or more operating characteristics of the destination storage server comprises an operating mode of the destination storage server, a storage limit of the destination storage server, or a software version of the another computing device and wherein the one or more conditions required to migrate the logical organization of the plurality of storage objects to the destination storage server comprises operating with a particular operating system version.

18. The computing device of claim 13, wherein the processor is further configured to execute the machine executable code to further cause the processor to communicate, to a cluster manager device, that the migrate servicing for the logical organization has changed to the destination storage server, when the determining indicates that the destination storage server is capable of servicing the storage requests that target the logical organization.

* * * * *